Figure 1:
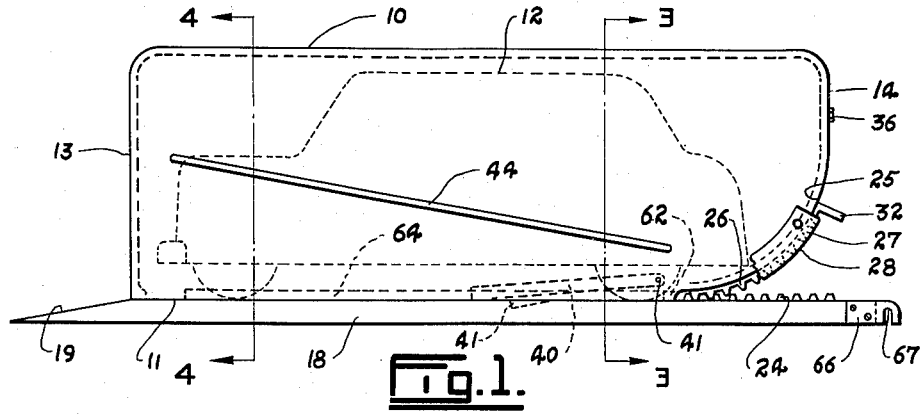

April 10, 1956 P. GIPSLIS 2,740,997
SHELTER FOR VEHICLES AND OTHER PURPOSES
Filed Nov. 1, 1952 2 Sheets-Sheet 1

INVENTOR
PETERIS GIPSLIS
BY
Fetherstonhaugh & Co.
ATTORNEYS

April 10, 1956 P. GIPSLIS 2,740,997
SHELTER FOR VEHICLES AND OTHER PURPOSES
Filed Nov. 1, 1952 2 Sheets-Sheet 2
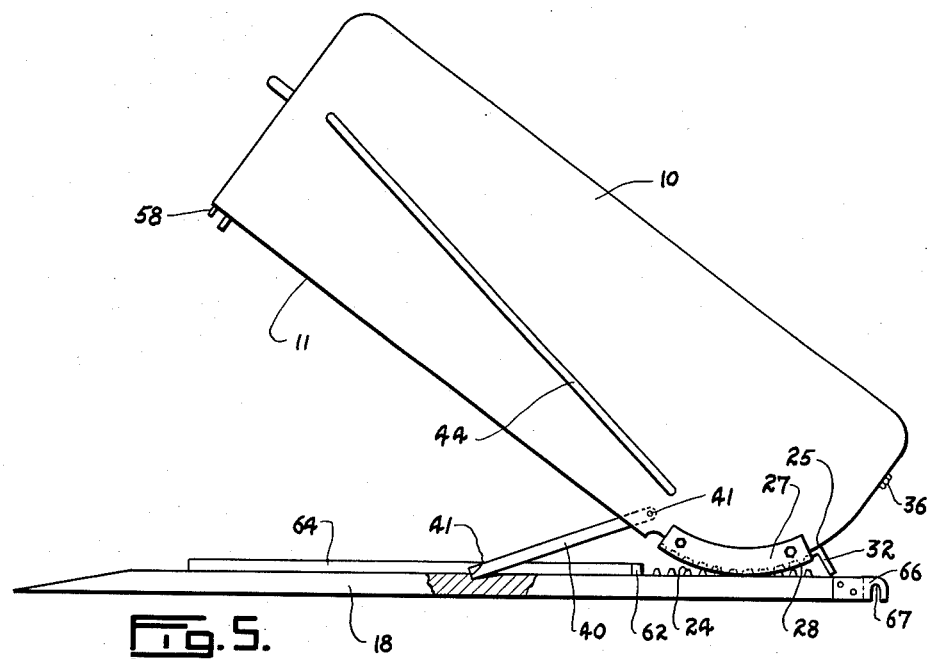
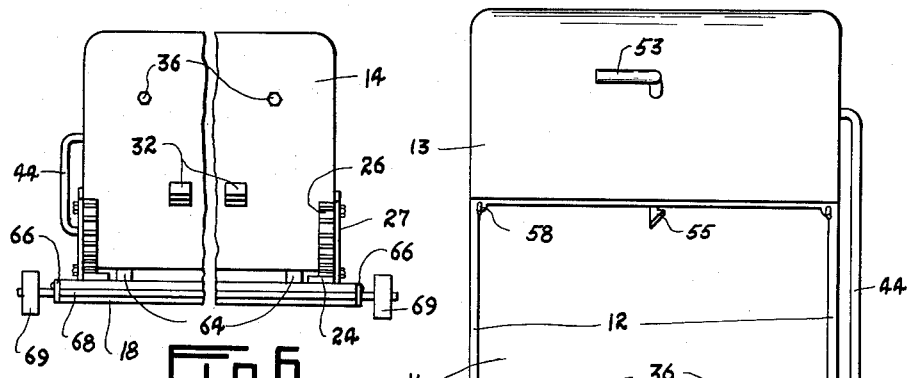
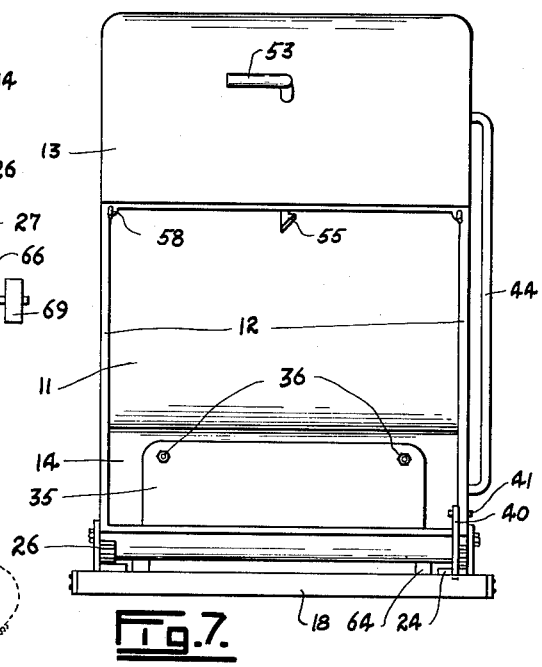
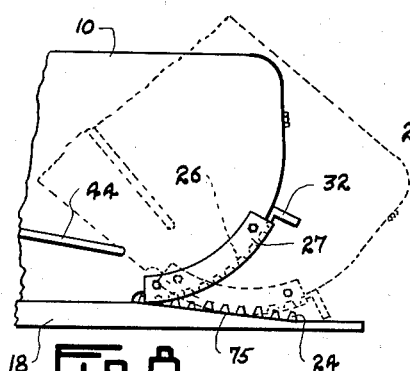
INVENTOR
PETERIS GIPSLIS
BY Fetherstonhaugh & Co.
ATTORNEYS

United States Patent Office 2,740,997
Patented Apr. 10, 1956

2,740,997

SHELTER FOR VEHICLES AND OTHER PURPOSES

Peter Gipslis, Vancouver, British Columbia, Canada, assignor of one-half to Erwin Heuchert, Vancouver, British Columbia, Canada Application November 1, 1952, Serial No. 318,217

11 Claims. (Cl. 20—1.13)

This invention relates to shelters primarily for use as garages for vehicles, such as automobiles, but which may be used for other purposes.

An object of the present invention is the provision of a shelter or garage which may be designed to fit closely around an automobile when it is closed, said shelter or garage being movable to an open position to permit access to the vehicle.

Another object is the provision of a shelter pivotally mounted so that an end thereof may be easily raised and lowered into open and closed positions.

A further object is the provision of a shelter or garage of the type described which does not require any springs, balancing arms, and the like.

A further object is the provision of a garage which is small in comparison to ordinary garages, which may be located in positions where it is not possible to put ordinary garages, which may be portable, and which may be adjusted to any convenient angle relative to the boundary lines of a lot.

A still further object is the provision of a garage, which in view of its compact nature, is much cheaper than the average garage in common use.

Up to the present time, garages for individual vehicles have to be constructed large enough to permit passengers to get out from at least one side of the vehicle. These garages are permanent structures which are costly to build, cannot be moved after they are constructed, and have to comply with local building regulations, that is, they usually have to be a specified distance from at least the lot side lines.

The present invention overcomes these difficulties by providing a shelter or garage comprising a housing which is open at the bottom thereof. This housing may rest on the ground or any other base, such as a movable platform. This housing is provided with pivoting means adjacent the back end thereof whereby the housing may be opened and closed by raising and lowering the front end thereof, at which time it swings around the pivot means. Counterbalancing means is attached to the housing and located on the side of the pivot means remote from the front end of the housing. This counterbalance is arranged to retain the housing in the open position and to permit it to be easily moved to the closed position. When the housing is in the open position, a vehicle may be driven into or out of it and the driver may easily get into or out of the vehicle when the housing is open. The housing may be easily closed against the force of the counterbalancing means to enclose the vehicle. One of the big advantages of this idea lies in the fact that the housing may be constructed so that the sides and top thereof are positioned close to the vehicle when the housing is closed. This is possible since the driver enters or leaves the vehicle while the housing is open. This means that the housing can be considerably smaller for a given vehicle than any garage known prior to this invention.

Figure 2:
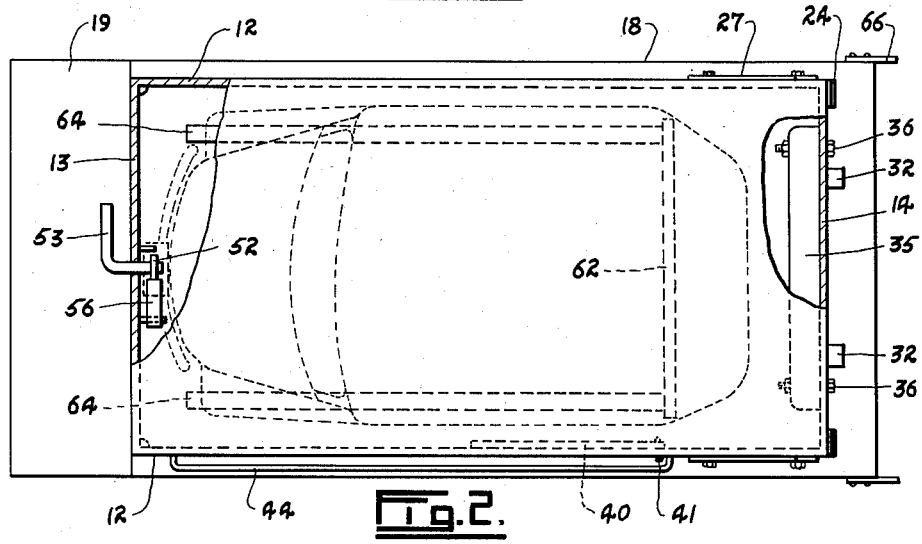
Figures 3, 4:
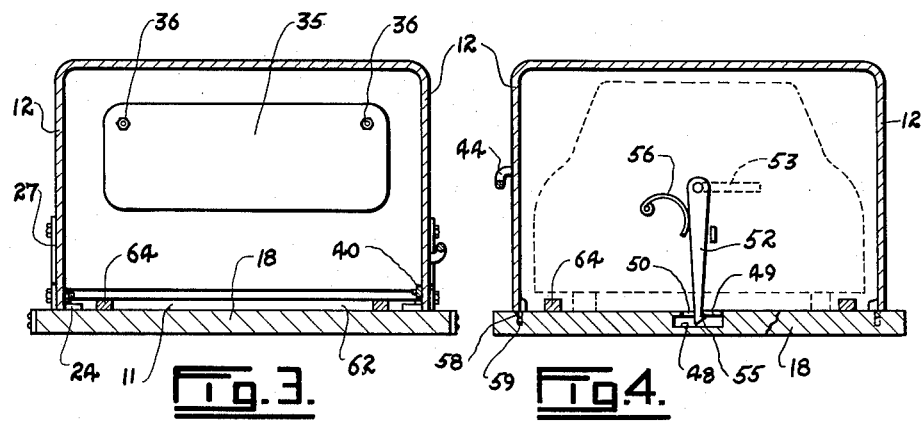

An example of this invention is illustrated in the accompanying drawings, in which, Figure 1 is a side elevation of the shelter or garage in the closed position, Figure 2 is a plan view of the shelter partly in section, Figure 3 is a vertical section taken on the line 3—3 of Figure 1, Figure 4 is a vertical section taken on the line 4—4 of Figure 1, Figure 5 is a side elevation of the shelter in the open position, Figure 6 is an elevation of the back end of the shelter in the closed position, showing wheels by means of which it may be easily transported from place to place, Figure 7 is a front elevation of the shelter in the open position, and Figure 8 is a fragmentary side elevation of an alternative form of the invention.

Referring to the drawings, 10 is a housing which preferably is completely closed, excepting at the bottom thereof, which is open as indicated at 11. If desired, suitable ventilation openings (not shown) may be provided. This housing has side walls 12, a front end 13 and a back end 14. The housing may rest on the ground or, as shown, it may be provided with a suitable base 18 having a ramp 19 extending up to the front end of the housing.

The housing 10 is provided with suitable pivoting means which will permit the front end 13 thereof to be moved upwardly and downwardly into open and closed positions. If the housing is to be used as a garage, the front end must be raised sufficiently to permit a vehicle to move into the housing. The idea is to pivotally mount the housing adjacent the back end 14 thereof to permit this action to take place. Various types of pivoting means may be used, but the one presently preferred comprises meshing gear means on the housing and on the base adjacent the back end of said housing. The gear meshing means may comprise one or more gear segments meshing with one or more racks. In this example, the gear meshing means includes a rack 24 on the base 18 at each side of the housing at and extending beneath the back end thereof. These racks extend longitudinally of the housing. If the base 18 is omitted, it is desirable to provide a suitable base for these racks. The back end of the housing preferably curves downwardly and inwardly at 25, and a gear segment 26 is mounted on this curved portion of the back end at each side thereof, each of said segments being located immediately above a rack 24 and adapted to mesh therewith. Actually, when the housing is in its closed position, the forward end of each gear segment is in mesh with the corresponding end of a rack, see Figure 1. Suitable means is provided for preventing lateral movement of the back end of the housing. This may be accomplished by securing a curved plate 27 to the housing beside each gear segment, each plate being on the same side of its segment as the other. For example, these plates may be located on the outer sides of their segments, as shown. The outer edge 28 of each plate of these plates extends outwardly no farther than the tips of the teeth of the adjacent gear segment. Each plate overlaps the outer side of the portion of the rack 24 meshing with its gear segment.

With this arrangement, the teeth of the gear segments 26 mesh with the teeth of the racks 24 when the front end of the housing is raised and lowered. This causes the housing to shift longitudinally during the opening and closing operations, but the meshing teeth ensure the housing returning to exactly the same position each time it is closed. Stop means is provided to limit the upward movement of the front end of the garage. This may be in the form of stops or brackets 32 mounted on and projecting from the back end 14 of the housing at points spaced above the base 18. When the housing is moved into the open position, as clearly shown in Figure 5, the stops 32 engage the base to limit the opening of the housing.

Counterbalancing means is attached to the housing and located on the side of the pivot means thereof remote from its front end. In the preferred form of the invention, this means consists of a counterweight 35 which may be secured to the back end 14 of the housing in any convenient manner, such as by nuts and bolts 36. When the housing is closed, the pivot point thereof is located at the front ends of the racks 24, and the counterweight 35 is positioned above and to the rear of this point. When the front end of the housing is started towards the open position, the counterweight exerts its maximum force. However, as the housing continues to open, the pivot point thereof shifts towards the back ends of the racks, thus reducing the effective force of the counterbalance. By the time the housing reaches the open position, it is practically in balance, the stops 32 being provided merely as a precautionary measure to prevent the housing from opening too much.

It is not absolutely necessary to provide means for locking the housing in the open position. However, if such is desired, an arm 40 may be pivotally mounted at 41 on a side wall 12 of the housing near the bottom thereof and near the gear segment 26. The free end of this arm rests on the base 18 when the housing is closed, but when the latter is opened, said end engages a notch 41 in the base, see Figure 5. In order to close the housing, it is necessary to lift the end of the arm clear of this notch.

A comparatively long handle 44 may be provided along one of the side walls 12, preferably on the same side of the housing as the arm 40. This handle may slope upwardly towards the front end of the housing so that when it is desired to close the latter, one end of the handle may easily be grasped. The person closing the housing, can walk towards the front end thereof as he draws it downwardly. The weight of the housing makes it easy to start the downward movement and keep it going. As the housing approaches the closed position, the counterweight 35 is raised up, and the pivot point of the housing shifts forwardly. The housing and its counterweight are approximately balanced when the former is in the closed position. The housing may slightly overbalance the weight at this time in order to remain in the closed position.

Suitable latching means may be provided for retaining the housing in the closed position. Referring particularly to Figures 2 and 4, the base 18 may be provided with a recess 48 therein having a keeper plate 49 over part thereof, leaving an opening 50 into the recess. A relatively long latch 52 is pivotally mounted by means of a handle 53 which extends through the front 13 of the casing. This latch has a lug 55 at its lower end which fits beneath the keeper plate 49 when the housing is closed with the latch projecting through the opening 50 into the recess 48. A spring 56 resiliently retains the latch in the locked position.

When it is desired to open the housing, the handle 53 may be turned to move the latch 52 until its lug 55 clears the keeper plate, after which the housing may be raised. When the housing is returned to its closed position, the lower end of the latch moves into the recess 48 until the lug 55 is pressed beneath the keeper plate.

Suitable means may be provided to prevent the front end of the housing from shifting laterally when it is closed. For this purpose, pins 58 may project downwardly from the lower edges of the sides 12 adjacent the front end thereof into sockets 59 in the base 18.

If desired, a stop 62 may be provided on the base spaced inwardly from the back end of the housing to limit the movement of a vehicle towards said end. In addition to this, guides 64 may extend longitudinally of the base which will ensure a vehicle backed or driven on to the base being in the proper position laterally with respect to the housing.

When a vehicle is positioned on the base, the housing may be drawn downwardly over it. As the driver may get into or out of the vehicle when the housing is open, it is not necessary to provide much clearance between the vehicle and the casing walls and top. This is a big advantage of the invention since there is no waste of material in the shelter.

The housing may be made of any desired material, such as aluminum. This means that it will not be very heavy so that the entire shelter may be easily shifted from one place to another. If desired, bracket 66 may be provided at the back end of the base having notches 67 therein through which an axle 68 may extend, see Figures 1 and 6. This axle has wheels 69 on its outer ends. These wheels make it possible to lift the front end of the base so that the shelter may easily move.

Figure 8 illustrates an alternative form of the invention. In this case, the base 18 is provided with an area 75 near the back end thereof which slopes downwardly towards said end. The racks 24 are mounted on this sloping area. This sloping of the racks makes it possible to use a lighter counterweight than is necessary in the other form of the invention.

When the front end of the housing 10 is raised, the gear segments 26 move down the sloping racks. This downward movement helps to raise the front end. When the front end is moved towards the closed position, it is necessary to exert enough force to move the gear segments back up the racks. As the front end is a considerable distance from the pivot point of the housing, the leverage makes it easy for a person to close the housing.

What I claim as my invention is:

1. A shelter for vehicles and other purposes comprising an open-bottomed housing having a back end curving downwardly and inwardly at the bottom thereof, a gear segment mounted on and extending around the curving portion of the back end and extending longitudinally of the housing, a rack fixedly supported beneath and meshing with the gear segment, said housing being opened and closed by raising and lowering the front end thereof, the forward end of the segment being positioned adjacent the corresponding end of the rack when the housing is closed and moving towards the opposite end of said rack as the housing is opened, and counterbalancing means attached to the back end of the housing above the curve thereof on the side of the segment remote from the front end of the housing, said counterbalance retaining the housing in the open position and permitting it to be easily moved to the closed position.

2. A shelter for vehicles and other purposes comprising a base, an open-bottomed housing resting on the base, said housing having a back end curving downwardly and inwardly at the bottom thereof, a gear segment mounted on and extending around the curving portion of the back end and extending longitudinally of the housing, a rack fixedly mounted on the base beneath and meshing with the gear segment, said housing being opened and closed by raising and lowering the front end thereof, the forward end of the segment being positioned adjacent the corresponding end of the rack when the housing is closed and moving towards the opposite end of said rack as the housing is opened, and counterbalancing means attached to the back end of the housing above the curve thereof on the side of the segment remote from the front end of the housing, said counterbalance retaining the housing in the open position and permitting it to be easily moved to the closed position.

3. A shelter for vehicles and other purposes as claimed in claim 2 including a stop mounted on and projecting from the back end of the housing positioned to engage the base when the housing reaches the open position.

4. A shelter for vehicles and other purposes as claimed in claim 2 in which the rack slopes downwardly in a direction away from the housing.

5. A shelter for vehicles and other purposes comprising a base, an open-bottomed housing resting on the base, said housing having a back end curving downwardly and inwardly at the bottom thereof, a gear segment mounted on and extending around the curving portion of the back end at each side thereof, a rack fixedly mounted on the base beneath and meshing with each gear segment, said housing being opened and closed by raising and lowering the front end thereof, the forward end of each segment being positioned adjacent the corresponding end of its rack when the housing is closed and moving towards the opposite end of the rack as the housing is opened, and counterbalancing means attached to the back end of the housing above the curve thereof on the side of the segment remote from the front end of the housing, said counterbalance retaining the housing in the open position and permitting it to be easily moved to the closed position.

6. A shelter for vehicles and other purposes as claimed in claim 5 including a plate secured to the housing beside each gear segment and overlapping the side of the adjacent rack, each plate being on the same side of its gear segment as the other, and the outer edge of each plate being curved to correspond with the curve of its segment.

7. A shelter for vehicles and other purposes as claimed in claim 5 including a long handle extending longitudinally of a side of the housing and sloping upwardly towards the front end of the latter.

8. A shelter for vehicles and other purposes as claimed in claim 5 including a locking arm pivotally mounted on a side of the housing near the back end thereof, said base having a notch therein near the arm into which the free end of the latter fits when the housing is moved to the open position.

9. In a shelter for vehicles and other purposes, an open-bottomed housing having front and back ends, a gear segment mounted on a side of the housing near the bottom of the back end thereof, said segment curving downwardly and forwardly of the housing, a rack fixedly supported beneath and meshing with the gear segment, said housing being opened and closed by raising and lowering the front end thereof, the forward end of the segment being positioned adjacent the corresponding end of the rack when the housing is closed and moving towards the opposite end of said rack as the housing is opened, and counterbalancing means attached to the back end of housing above the segment, said counterbalance retaining the housing in the open position and permitting it to be easily moved to the closed position.

10. A shelter for vehicles and other purposes comprising a base, an open-bottomed housing resting on the base and having front and back ends, a gear segment mounted on each side of the housing near the bottom of the back end thereof, said segments curving downwardly and forwardly of the housing, a rack fixedly mounted on the base beneath and meshing with each gear segment, said housing being opened and closed by raising and lowering the front end thereof, the forward end of each segment being positioned adjacent the corresponding end of its rack when the housing is closed and moving towards the opposite end of the rack as the housing is opened, and counterbalancing means attached to the back end of the housing above the segments, said counterbalance retaining the housing in the open position and permitting it to be easily moved to the closed position.

11. A shelter for vehicles and other purposes comprising a base, an open-bottomed housing resting on the base and having front and back ends, a gear segment mounted on each side of the housing near the bottom of the back end thereof, said segments curving downwardly and forwardly of the housing, a rack fixedly mounted on the base beneath and meshing with each gear segment, said housing being opened and closed by raising and lowering the front end thereof, the forward end of each segment being positioned adjacent the corresponding end of its rack when the housing is closed and moving towards the opposite end of the rack when the housing is opened, counterbalancing means attached to the back end of the housing above the segments, said counterbalance retaining the housing in the open position and permitting it to be easily moved to the closed position, and wheels removably connected to the base to enable the latter to be transported from place to place.

References Cited in the file of this patent

UNITED STATES PATENTS

| | | |
|---|---|---|
| 1,102,792 | Scherzer | Sept. 8, 1914 |
| 2,296,413 | Zell | Sept. 22, 1942 |

FOREIGN PATENTS

| | | |
|---|---|---|
| 251,400 | Great Britain | of 1926 |
| 820,965 | Germany | Nov. 15, 1951 |
| 988,383 | France | of 1951 |
| 830,697 | Germany | Feb. 7, 1952 |
| 667,735 | Great Britain | Mar. 5, 1952 |